(12) United States Patent
Verbridge et al.

(10) Patent No.: US 11,565,586 B2
(45) Date of Patent: Jan. 31, 2023

(54) MODULAR HIGH-LOW RANGE GEARBOX ATTACHMENT

(71) Applicant: Rivian IP Holdings, LLC, Plymouth, MI (US)

(72) Inventors: Mason Verbridge, Canton, MI (US); Cameron P. Williams, Dexter, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 124 days.

(21) Appl. No.: 17/211,941

(22) Filed: Mar. 25, 2021

(65) Prior Publication Data

US 2022/0305907 A1  Sep. 29, 2022

(51) Int. Cl.
*B60K 17/04* (2006.01)
*B60K 7/00* (2006.01)

(52) U.S. Cl.
CPC .......... *B60K 17/046* (2013.01); *B60K 7/0007* (2013.01); *B60K 2007/0061* (2013.01)

(58) Field of Classification Search
CPC ................ B60K 17/046; B60K 7/0007; B60K 2007/0061
See application file for complete search history.

(56) References Cited

U.S. PATENT DOCUMENTS

| | | | |
|---|---|---|---|
| 2021/0245599 A1* | 8/2021 | Mepham | B60K 1/00 |
| 2021/0252958 A1* | 8/2021 | Engerman | B60K 1/00 |
| 2022/0003308 A1* | 1/2022 | Verbridge | F16H 57/0415 |

* cited by examiner

*Primary Examiner* — Erez Gurari
(74) *Attorney, Agent, or Firm* — Clements Bernard Walker; Christopher L. Bernard

(57) ABSTRACT

A gearbox attachment of a wheel drive unit A-shield assembly for an electric vehicle four motor powertrain system is disclosed. The gearbox attachment includes a housing, a gear reduction assembly, and an actuator assembly. The housing is adapted to fasten to an A-shield of the wheel drive unit A-shield assembly. The housing includes an outer ring. The gear reduction assembly is at least partially received in the outer ring. The gear reduction assembly is adapted to receive an output of a gearbox of the wheel drive unit A-shield assembly that is adapted to provide an output of a motor to a single wheel of the electric vehicle. The gear reduction assembly is adapted to provide a gear reduction for a higher torque and slower speed in a gear reduction mode. The actuator assembly adapted to actuate the gear reduction assembly output between the gear reduction mode and a standard mode.

20 Claims, 6 Drawing Sheets

MODULAR HIGH-LOW RANGE GEARBOX ATTACHMENT

TECHNICAL FIELD

The present disclosure generally relates to the automotive and industrial equipment fields. More particularly, the present disclosure relates to a wheel drive assembly with a modular high-low range gearbox attachment.

BACKGROUND

Drive systems for electric vehicles are capable of operating in a variety of conditions, including operating at a high torque output while at low speeds. However, motors outputting high torques often struggle to maintain these torque outputs for long durations due to thermal overload, and in particular, due to the thermal limits of the motor's stator and inverter's insulated-gate bipolar transistors (IGBTs). These high torque output scenarios are common in off roading, rock crawling, heavy duty towing, and while operating an electric vehicle in extreme weather conditions.

The present background is provided by way of illustrative environmental context only. It will be readily apparent to those of ordinary skill in the art that the principles of the present disclosure may be implemented in other environmental contexts equally.

SUMMARY

The present disclosure provides a drive train system with individual wheel drive units that each include a gearbox attachment. The drive train system is one of a front drive train system and a rear drive train system of a four-motor powertrain assembly for an electric vehicle. The gearbox attachment, which is a high-low range gearbox (often referred to as a crawlbox), introduces a high ratio gear reduction that allows high torque at low speed for long durations. This moves the strain of operating in high torque situations from the motor to the wheel, which eliminates the thermal limitations of the motor under high torque scenarios. The high ratio gear reduction is particularly useful for off roading, rock crawling, heavy duty towing, and extreme weather conditions, particularly while being applied within an individual wheel drive unit.

The gearbox attachment is modular and is attachable to any of the individual wheel units of the four-motor powertrain assembly. In some embodiments, the gearbox attachment replaces one or more of the inner CV joint and the A-shield mounting bracket. This configuration allows the gearbox attachment to easily be added to an existing wheel drive unit or removed from a wheel drive unit without replacing the A-shield or the half shaft of the wheel drive unit.

In one illustrative embodiment, the present disclosure provides gearbox attachment of a wheel drive unit A-shield assembly for an electric vehicle four motor powertrain system. The gearbox attachment includes a housing, a gear reduction assembly, and an actuator assembly. The housing is adapted to fasten to an A-shield of the wheel drive unit A-shield assembly. The housing includes an outer ring. The gear reduction assembly is at least partially received in the outer ring. The gear reduction assembly is adapted to receive an output of a gearbox of the wheel drive unit A-shield assembly. The A-shield assembly is adapted to provide an output of a motor to a single wheel of the electric vehicle. The gear reduction assembly is adapted to provide a gear reduction for a higher torque and slower speed in a gear reduction mode than a torque and speed in a standard mode. The actuator assembly is adapted to actuate the gear reduction assembly output between the gear reduction mode and the standard mode.

In some embodiments, the standard mode provides no gear reduction to the output of the gearbox. Optionally, the gear reduction assembly provides a gear reduction between 1.5:1 and 5.0:1 in the gear reduction mode and a gear reduction of 1:1 in the standard mode.

In some embodiments, the housing includes a mounting bracket adapted to connect to a subframe of the electric vehicle, and wherein the mounting bracket is adapted to connect the A-shield to the subframe. Optionally, the housing, including the outer ring and the mounting bracket, is a unitary structure that is a single structurally formed entity.

In some embodiments, the gear reduction assembly is a planetary gear assembly includes a gear shaft, planetary gears, pins, an inner carrier assembly, and an outer carrier assembly. The gear shaft includes a sun gear and a spline adapted to receive the output of the gearbox. The pins support the planetary gears. The inner carrier assembly positioned at an input side of the gearbox attachment. The outer carrier assembly positioned at an output side of the gearbox attachment.

In some embodiments, the gearbox attachment further includes a cooling attachment adapted to connect to a face of the gearbox attachment and adapted to provide cooling for the gear reduction assembly.

In another illustrative embodiment, the present disclosure provides an A-shield assembly of a wheel drive unit of a four motor powertrain system of an electric vehicle. The A-shield assembly includes an A-shield, a gearbox, and a gearbox attachment. The A-shield adapted to support a motor mounted thereto. The motor adapted to provide power to a single wheel of the electric vehicle. The gearbox is mounted to the A-shield. The gearbox includes a gear assembly adapted to receive an output of the motor and output a first gear reduction. The gearbox attachment includes a housing, a gear reduction assembly, and an actuator assembly. The housing is coupled to the A-shield. The housing includes an outer ring. The gear reduction assembly is at least partially received in the outer ring. The gear reduction assembly is coupled to the gear assembly to receive the output of the gearbox. The gear reduction assembly is adapted to provide a second gear reduction for a higher torque and slower speed in a gear reduction mode than that of the first gear reduction. The actuator assembly is adapted to actuate the gear reduction assembly output between the gear reduction mode and a standard mode.

In some embodiments, the standard mode provides no gear reduction to the output of the gearbox. Optionally, the second gear reduction is a gear reduction between 1.5:1 and 5.0:1 in the gear reduction mode and a gear reduction of 1:1 in the standard mode.

In some embodiments, the housing includes a mounting bracket adapted to connect to a subframe of the electric vehicle, and the mounting bracket is adapted to connect the A-shield to the subframe. Optionally, the housing, including the outer ring and the mounting bracket, is a unitary structure that is a single structurally formed entity.

In some embodiments, the gear reduction assembly is a planetary gear assembly includes a gear shaft, planetary gears, pins, an inner carrier assembly, and an outer carrier assembly. The gear shaft includes a sun gear and a spline coupled to the output of the gear assembly of the gearbox. The pins support the planetary gears. The inner carrier assembly positioned at an input side of the gearbox attachment. The outer carrier assembly positioned at an output side of the gearbox attachment.

In some embodiments, the gearbox attachment further includes a cooling attachment adapted to connect to a face of the gearbox attachment and adapted to provide cooling for the gear reduction assembly.

In a further illustrative embodiment, the present disclosure provides a wheel drive unit of a four motor powertrain system of an electric vehicle. The wheel drive unit includes an A-shield, a motor, a gearbox, and a gearbox attachment. The motor is adapted to output power to a single wheel. The motor is coupled to the A-shield. The gearbox is mounted to the A-shield. The gearbox includes a gear assembly coupled to an output of the motor and is adapted to output a first gear reduction. The gearbox attachment includes a housing, a gear reduction assembly, and an actuator assembly. The housing is coupled to the A-shield. The housing includes an outer ring. The gear reduction assembly is at least partially received in the outer ring. The gear reduction assembly is coupled to the gear assembly to receive the output of the gearbox. The gear reduction assembly is adapted to provide a second gear reduction for a higher torque and slower speed in a gear reduction mode than that of the first gear reduction. The actuator assembly is adapted to actuate the gear reduction assembly output between the gear reduction mode and a standard mode.

In some embodiments, the standard mode provides no gear reduction to the output of the gearbox. Optionally, the second gear reduction is a gear reduction between 1.5:1 and 5.0:1 in the gear reduction mode and a gear reduction of 1:1 in the standard mode.

In some embodiments, the housing includes a mounting bracket adapted to connect to a subframe of the electric vehicle, and the mounting bracket is adapted to connect the A-shield to the subframe. Optionally, the housing, including the outer ring and the mounting bracket, is a unitary structure that is a single structurally formed entity.

In some embodiments, the gear reduction assembly is a planetary gear assembly includes a gear shaft, planetary gears, pins, an inner carrier assembly, and an outer carrier assembly. The gear shaft includes a sun gear and a spline coupled to the output of the gear assembly of the gearbox. The pins support the planetary gears. The inner carrier assembly positioned at an input side of the gearbox attachment. The outer carrier assembly positioned at an output side of the gearbox attachment.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF ILLUSTRATIVE EMBODIMENTS

Again, the present disclosure provides a drive train system with individual wheel drive units that each include a gearbox attachment. The drive train system is one of a front drive train system and a rear drive train system of a four-motor powertrain assembly for an electric vehicle, such as the power train assembly disclosed in U.S. patent application Ser. No. 16/695,815 entitled Electric Vehicle Powertrain Assembly, which is hereby incorporated by reference. The gearbox attachment, which is a high-low range gearbox (often referred to as a crawlbox), introduces a high ratio gear reduction that allows high torque at low speed for long durations. This moves the strain of operating in high torque situations from the motor to the wheel, which eliminates the thermal limitations of the motor under high torque scenarios. The high ratio gear reduction is particularly useful for off roading, rock crawling, heavy duty towing, and extreme weather conditions, particularly while being applied within an individual wheel drive unit.

The gearbox attachment is modular and is attachable to any of the individual wheel units of the four-motor powertrain assembly. This modularity allows for a selectable low range for the high torque and low speed applications. In some embodiments, the gearbox attachment replaces one or more of the inner CV joint and the A-shield mounting bracket. This configuration allows the gearbox attachment to easily be added to an existing wheel drive unit or removed from a wheel drive unit without replacing the A-shield or the half shaft of the wheel drive unit.

Figure 1:
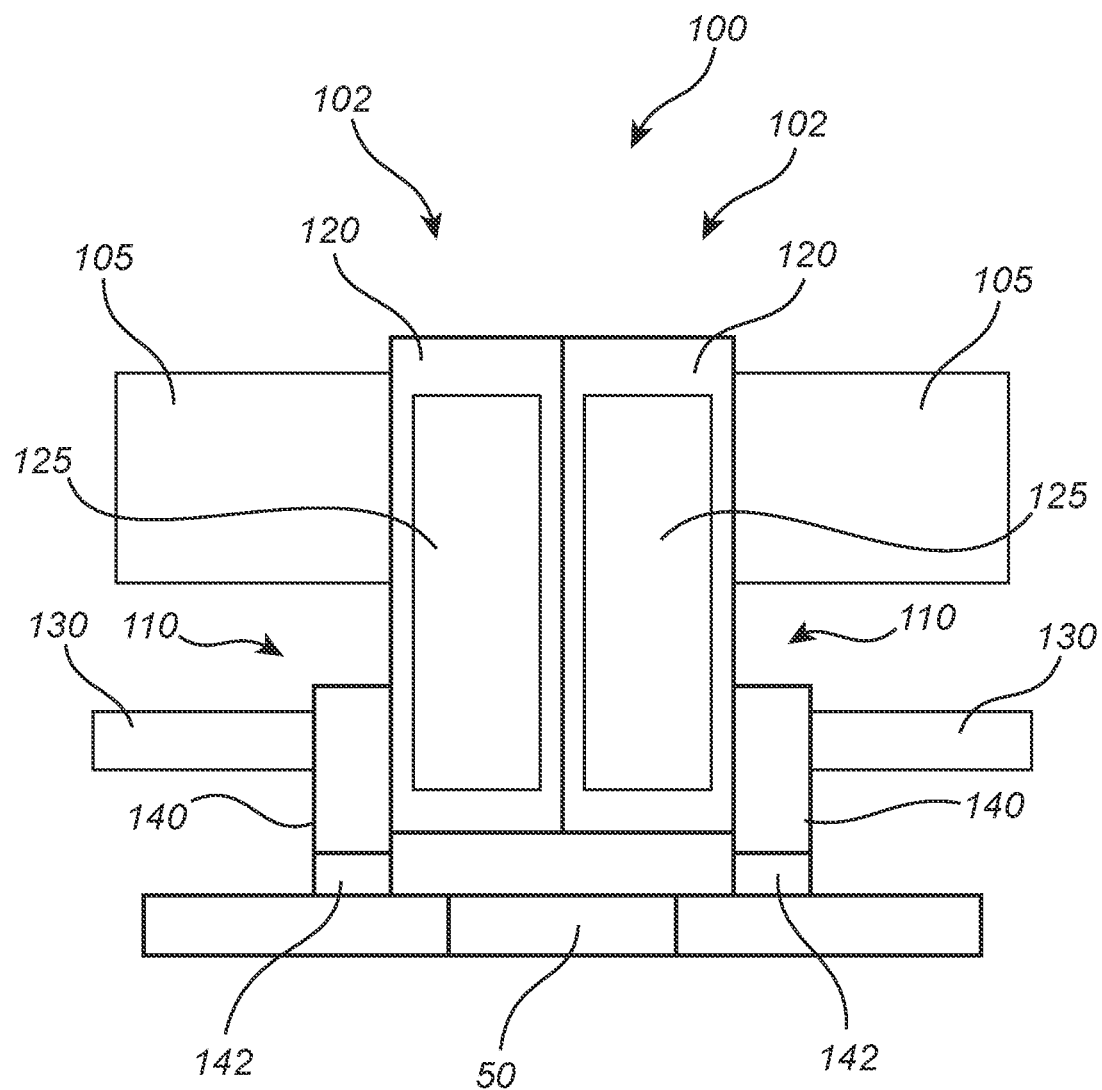
FIG. 1 is a schematic illustration of a drive train system of a four-motor powertrain assembly for an electric vehicle.

FIG. 1 is a schematic illustration of a drive train system 100 of a four-motor powertrain assembly for an electric vehicle. Referring to FIG. 1, the drive train system 100 includes wheel drive units 102. Each of the wheel drive units 102 are adapted to drive one of the wheels of the electric vehicle. A four-motor powertrain assembly, such as the power train assembly disclosed in U.S. patent application Ser. No. 16/695,815, typically includes four wheel drive units 102 arranged in two drive train systems 100, where one drive train system 100 drives the front wheels of the electric vehicle and a second drive train system 100 drives the rear wheels of the electric vehicle. Each of the wheel drive units 102 includes a motor 105, a half shaft 130, and an A-shield assembly 110. The A-shield assembly 110 is adapted to transfer power from the motor 105 to the half shaft 130 for driving the wheel connected to the wheel drive unit 102 via the half shaft 130. In embodiments, the half shaft 130 includes a shaft, attachment interfaces, and one or more of an inner CV joint and an outer CV joint.

The A-shield assembly 110 includes the A-shield 120, the gearbox 125, and the gearbox attachment 140. The A-shield 120 is adapted to support the motor 105 and retain the gearbox 125. The gearbox 125 includes the gearset and related shafts, retainers, shields, and the like, for the gearset. The gearbox 125 is adapted to provide a standard gear reduction for operation of the electric vehicle under general operating conditions, such as during high-speed, low torque operation. In a four-motor powertrain assembly, each gearbox 125 provides gear reduction from a single motor 105 and only outputs to a single half shaft 130, such that each wheel of the electric vehicle is driven by a separate motor via separate gearboxes 125.

Figure 2:
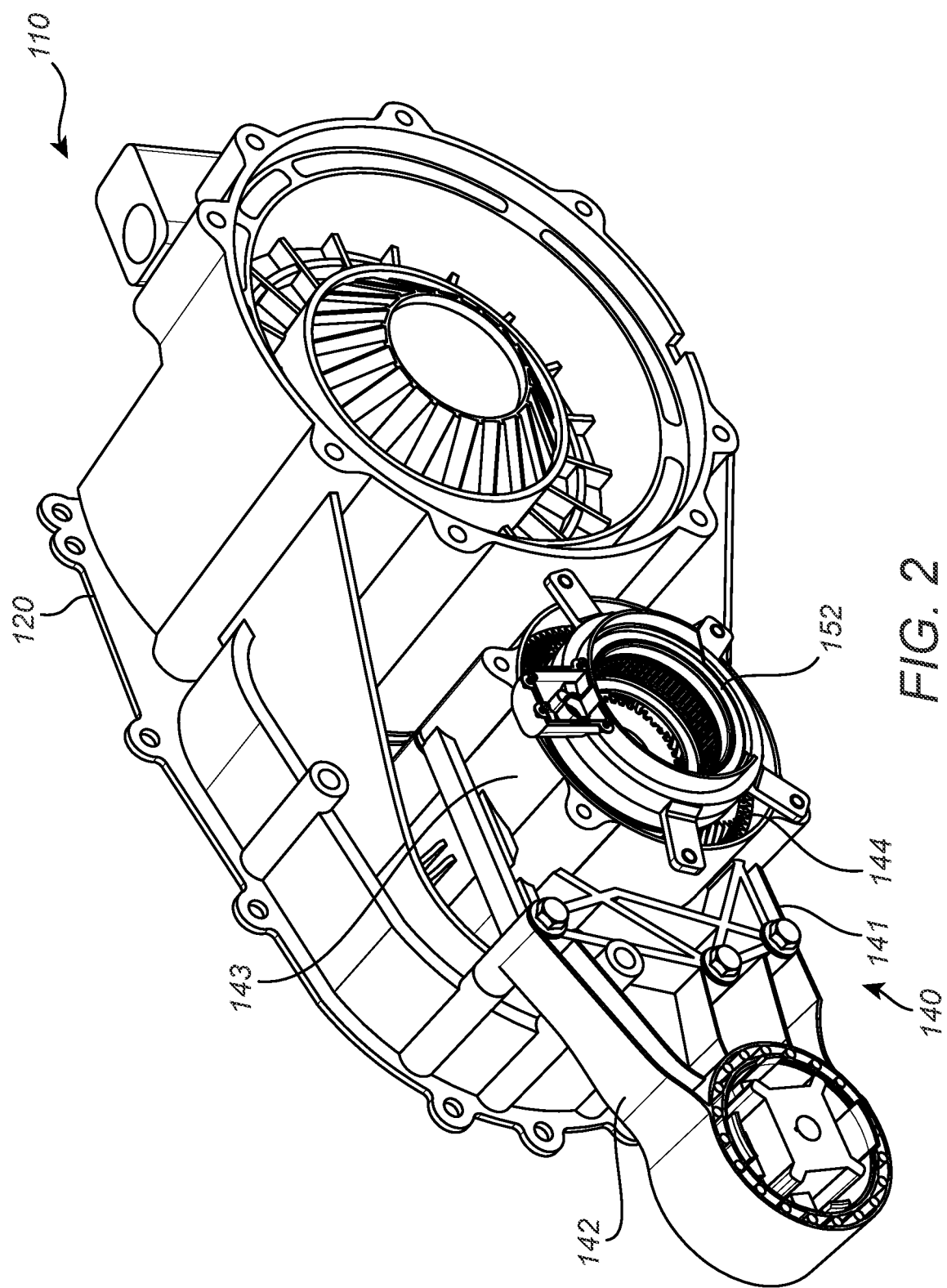
FIG. 2 is a perspective view of an A-shield assembly of a wheel drive unit of the drive train system of FIG. 1.
Figure 3:
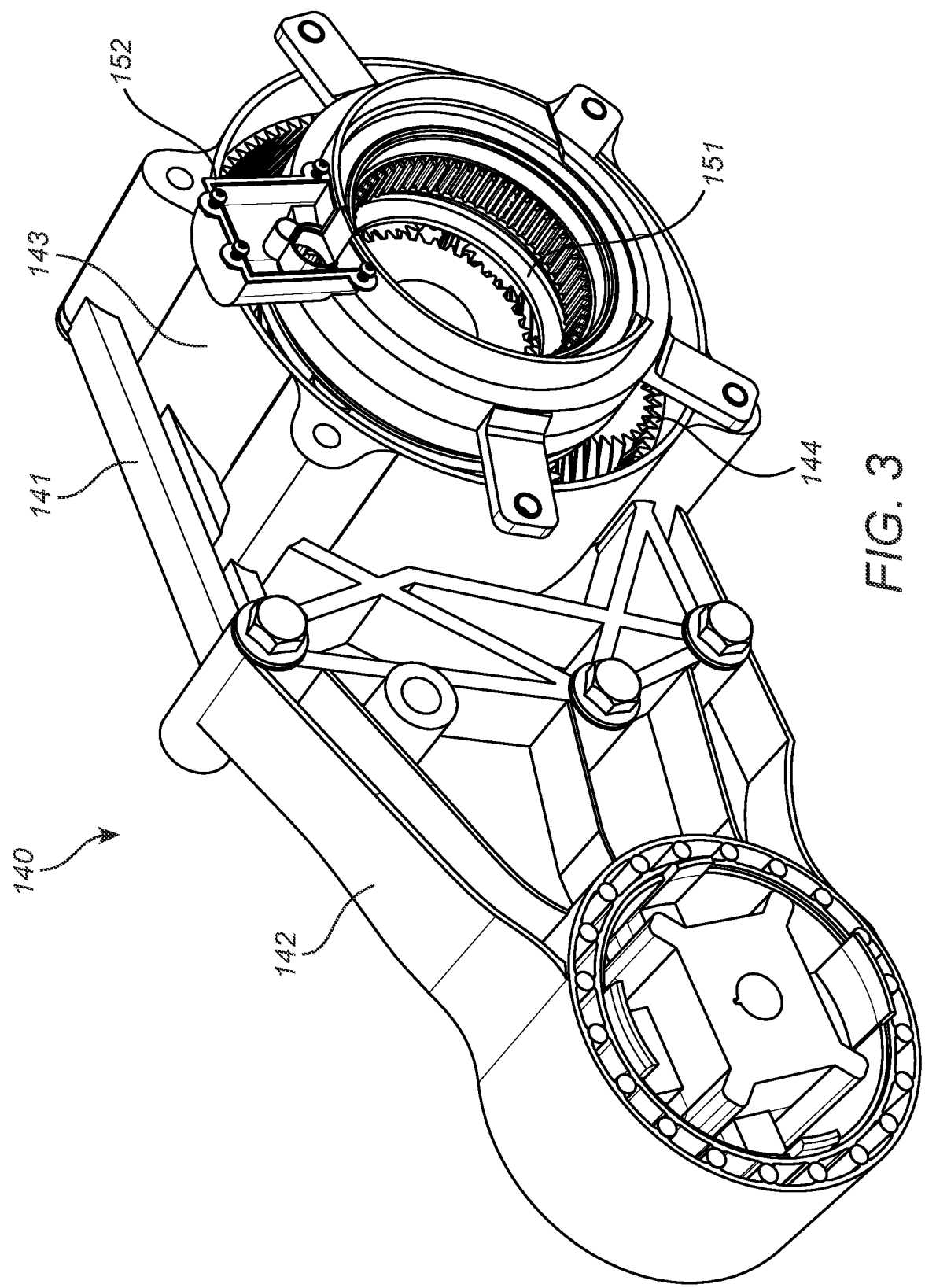
FIG. 3 is a perspective view of a gear attachment of the A-shield assembly of FIG. 2.
Figure 4:
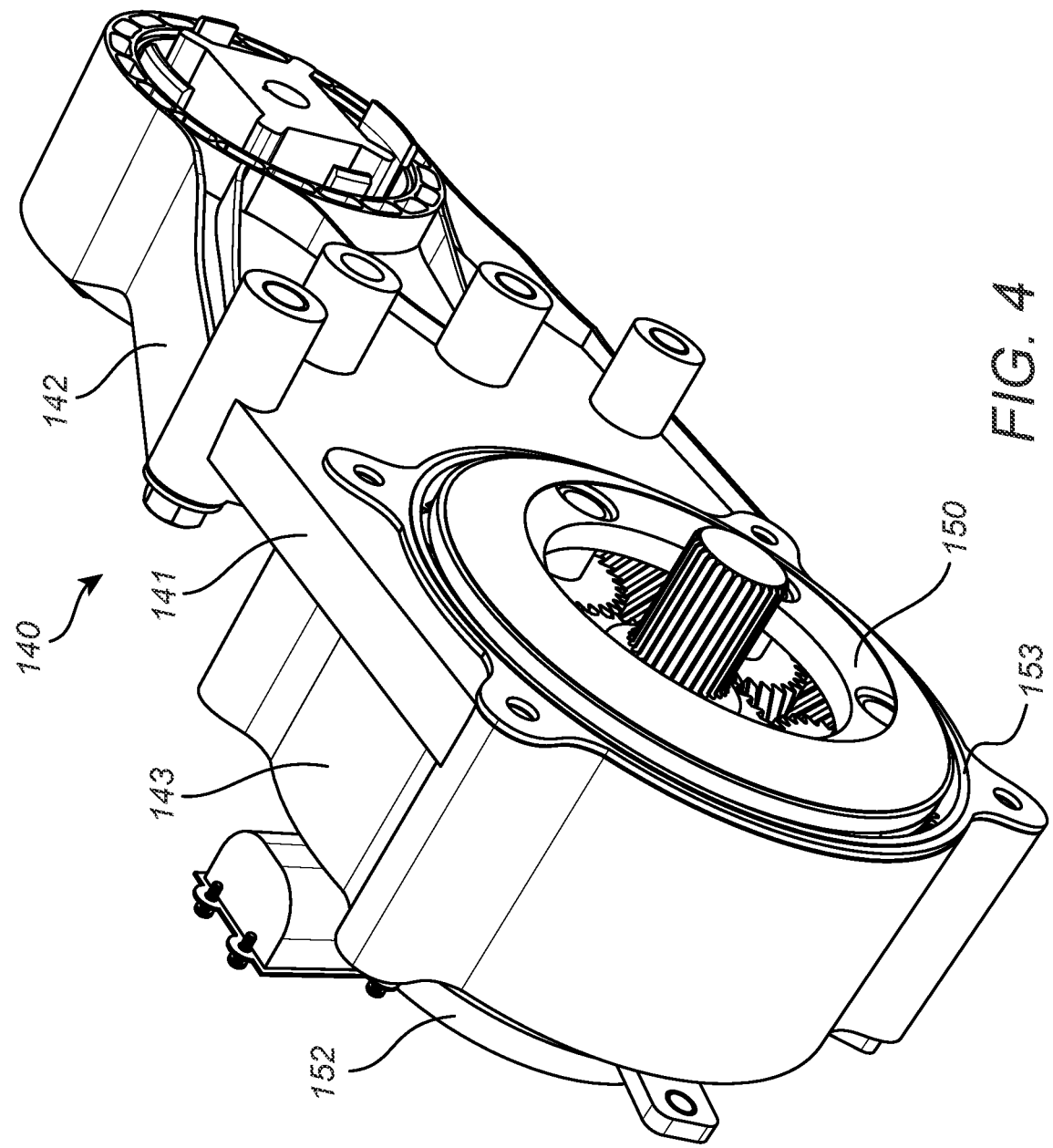
FIG. 4 is an alternate perspective view of the gear attachment of FIG. 3.
Figure 5:
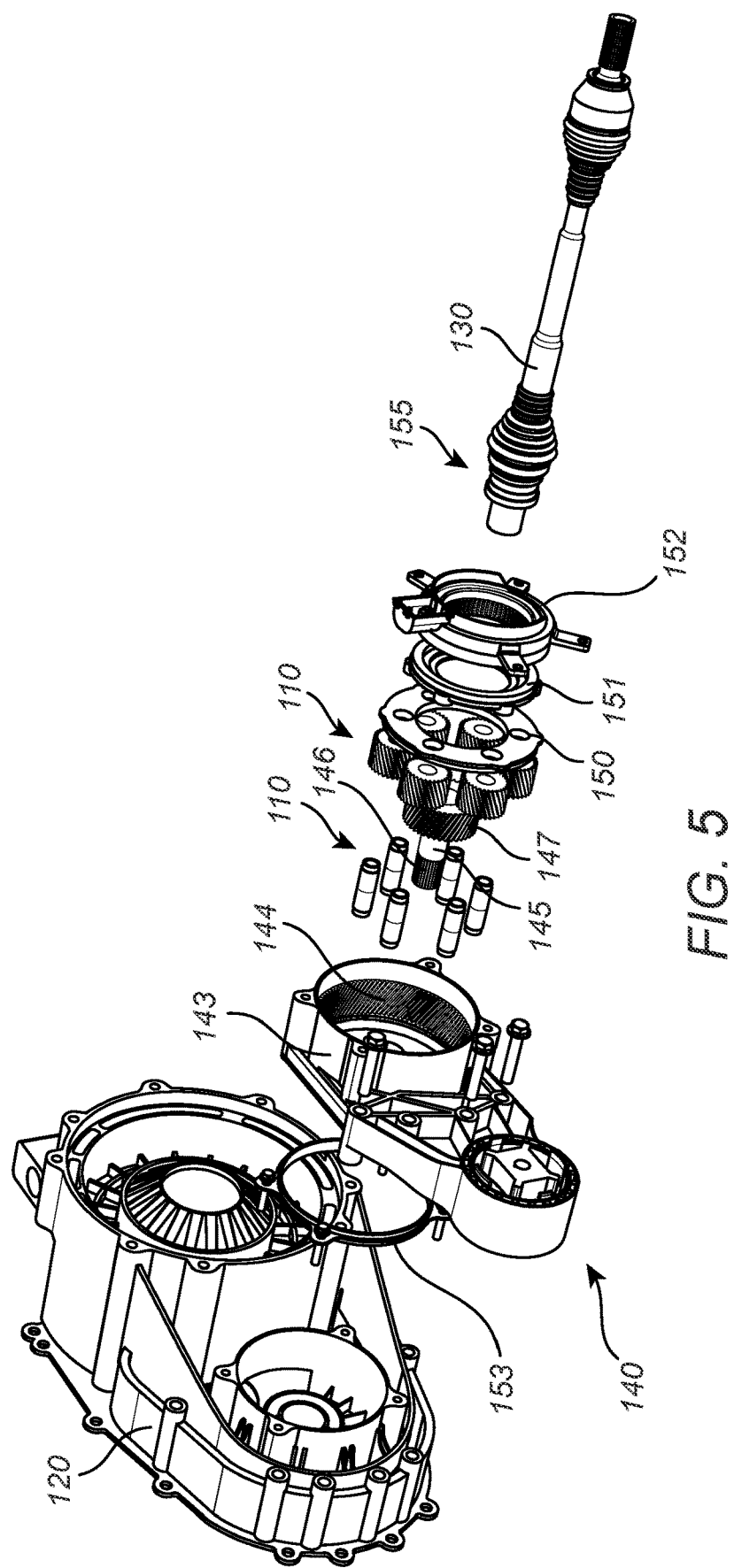
FIG. 5 is an exploded view of the A-shield assembly of FIG. 2 with a half shaft of the wheel drive unit.

FIG. 2 is a perspective view of the A-shield assembly 110 of a wheel drive unit 102 of the drive train system 100 of FIG. 1. FIG. 3 is a perspective view of the gear attachment 140 of the A-shield assembly 120 of FIG. 2. FIG. 4 is an alternate perspective view of the gear attachment 140 of FIG. 3. FIG. 5 is an exploded view of the A-shield assembly 120 of FIG. 2 with the half shaft 130 of the wheel drive unit 102. Referring to FIGS. 2-5, the gearbox attachment 140 is a modular device that attaches to the output of the gearbox 125 and is adapted to provide a further gear reduction in driving conditions that require high torques at slow speeds, while providing no gear reduction during general operating conditions. In some embodiments, the gearbox attachment 140 is adapted to provide a gear reduction ratio between 1.5:1 and 5.0:1 in a gear reduction mode of operation, while providing a 1:1 gear ratio in a standard mode of operation.

The gearbox attachment 140 includes a housing 141, a gear reduction assembly, and an actuator assembly 152. The housing 141 includes an outer ring 143 adapted to house the gear reduction assembly. In embodiments, the housing 141 also includes a mounting bracket 142 that is adapted to connect to the vehicle subframe 50 (refer to FIG. 1), and in particular, connect the A-shield to the vehicle subframe 50. In the embodiment illustrated, the mounting bracket 142 includes a large, single bushing, that is adapted to connect to a U-bracket on the vehicle subframe 50 at one end and connects to the A-shield 120 at multiple connection points along a perimeter of one side of the A-shield 120. In embodiments, the mounting bracket 142 includes ridges to provide structural integrity to the mounting bracket 142, while reducing the overall weight of the housing 141.

In the embodiment illustrated, the housing 151, including the outer ring 143 and the mounting bracket 142, is a unitary structure that is a single structurally formed entity. This configuration, as noted above, allows the gearbox attachment 140 to be added to a standard wheel drive unit by simply swapping the gearbox attachment 140 in place of a couple of components, such as a standard A-shield mounting bracket, without changing or replacing the A-shield, the half shaft, or any connection points to the vehicle subframe. In other embodiments, the mounting bracket 142 is a separate structure that connects to the vehicle subframe 50 at one end and to both of the outer ring 143 and to the A-shield at the other end.

In some embodiments, the gearbox attachment 140 replaces the inner CV joint. In some of these embodiments, the gearbox attachment 140 is further adapted to perform the function of the inner CV joint. In further embodiments, the inner CV joint is integral to the half shaft 130 and is positioned in such a manner so as to not be affected by the insertion of the gearbox attachment 140 into the standard wheel drive unit.

The gear reduction assembly is adapted to provide the two gear ratios of the gearbox attachment 140 discussed above. In the embodiment illustrated, the gear reduction assembly is a planetary gear assembly and includes a ring gear 143, a gear shaft 145, planetary gears 148, pins 149, an inner carrier assembly 150, and an outer carrier assembly 151.

The ring gear 144 is positioned within at least partially received in the outer ring 143 of the housing 151. In the embodiment illustrated, the ring gear 144 is an insert that is inserted into the outer ring 143. In embodiments, the ring gear 144 is formed of a harder material than the housing 141. In some embodiments, the housing 141 is formed of aluminum and the ring gear 144 is formed of steel. However, other materials for both the housing 141 and of the ring gear 144 are also contemplated.

The gear shaft 145 includes a spline 146 at one end and a sun gear 147 at the other end. The spline 146 is adapted to mate with and receive the output of the gearbox 125. The sun gear 147 is the internal gear of the gear reduction assembly and is adapted to transfer the output of the gearbox 125 to the gear reduction assembly.

The planetary gears 148 are positioned around the sun gear 147 and are held within the ring gear 144 by pins 149, the inner carrier assembly 150, and the outer carrier assembly 151. The inner carrier assembly 150 is positioned at an input side of the gearbox attachment 140 adjacent to the A-shield 120, while the outer carrier assembly 150 is positioned at an output side of the gearbox attachment 140 opposite the A-shield 120.

The actuator assembly 152 is positioned adjacent to the outer carrier assembly 150. The actuator assembly 152 is adapted to actuate the output of the gearbox attachment 140 between the standard output with no gear reduction in the standard mode and the high-torque output with gear reduction via the gear reduction assembly in the gear reduction mode.

In embodiments, the gearbox attachment 140 includes an inner close out cover 153 that attaches to an inner side of the housing 141 and is positioned adjacent to the A-shield 120 during assembly.

Referring to FIG. 5, the A-shield assembly also includes a torque adapter and a clutch ring 155 positioned at an inner end of the half shaft 130 and adapted to operate with the actuator assembly 152 to actuate the output of the gearbox attachment 140 between the standard output with no gear reduction in the standard mode and the high-torque output with gear reduction via the gear reduction assembly in the gear reduction mode.

As noted above, the gearbox attachment 140 is a high-low range gearbox (often referred to as a crawlbox) that provides a high ratio gear reduction to the output of the motor 105. This moves the strain of operating in high torque situations to the wheel, which reduces the strain on the motor 105, and in particular, eliminates the thermal limitations of the motor under high torque scenarios.

By being arranged in a modular arrangement with the ability to replace existing components within a standard wheel drive unit 102, such as the wheel drive unit disclosed in U.S. patent application Ser. No. 16/695,815, the gearbox attachment 140 is easily added to each of the wheel drive units 102 of either or both of a front drive train assembly and a rear drive train assembly. This simplifies the manufacturing process as the A-shield 120 and the half shaft 130 are the same for both the gear reduction A-shield assembly 110 disclosed herein and a standard A-shield assembly (that does not include the gearbox attachment 140). In this manner, the A-shield 120 and the half shaft 130 is the same for each of the wheel drive units 102 for both the front drive train assembly and the rear drive train assembly (aside from a handedness which may be required for each depending on the individual orientation thereof). During assembly, either the gearbox attachment 140 is attached or standard components are attached to each of the wheel drive units depending on whether the drive train assembly is to be configured as a standard assembly or a high-low gear reduction assembly.

Further, this arrangement simplifies aftermarket modifications for adding or removing the gearbox attachment 140 to or from a wheel drive unit 102 since the A-shield 120 and the half shaft 130 do not need to be replaced during such a modification.

Figure 6:
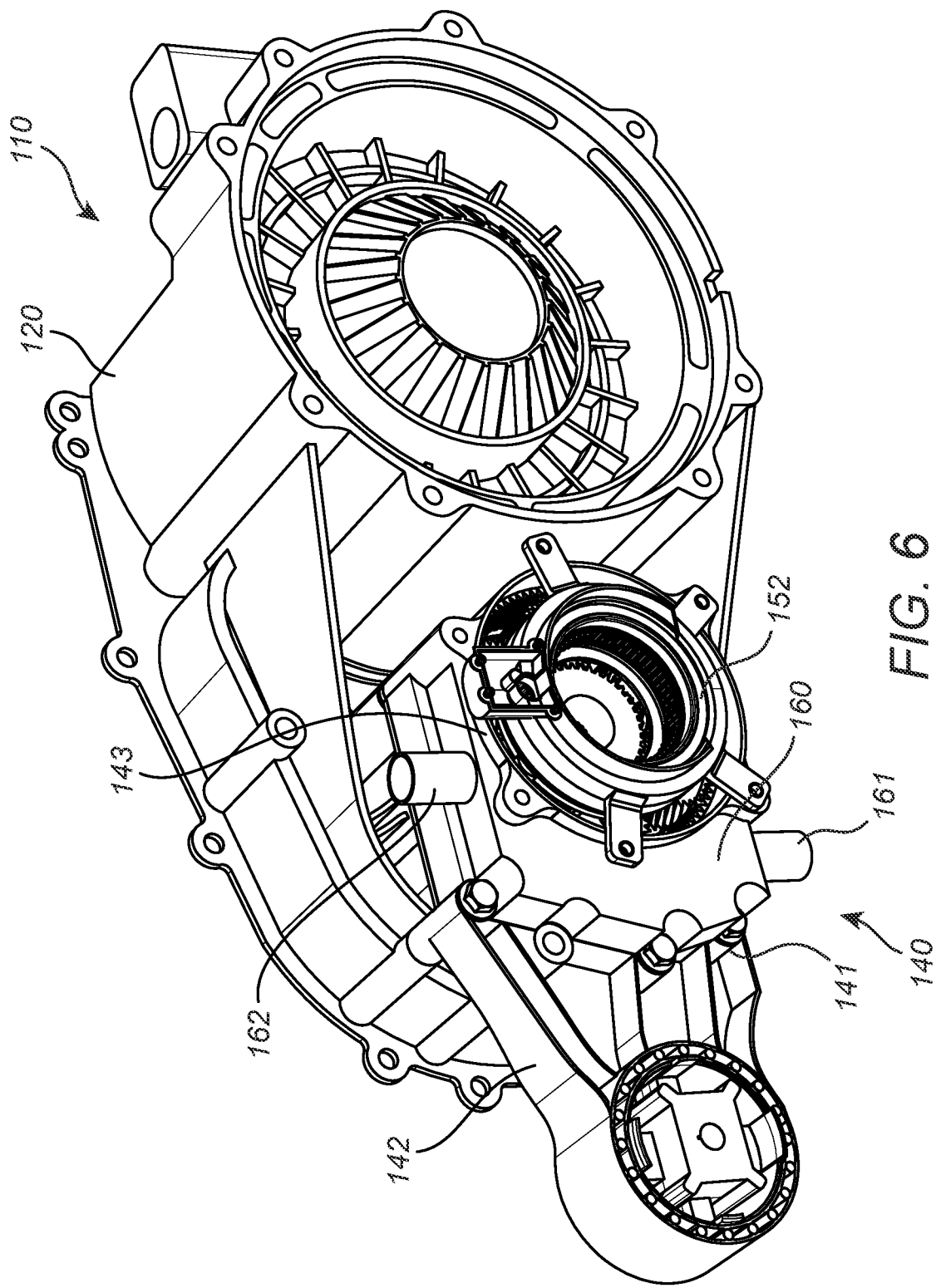
FIG. 6 is an embodiment of the A-shield assembly of FIG. 2 further including a cooling attachment.

FIG. 6 is an embodiment of the A-shield assembly 110 of FIG. 2 further including a cooling attachment 160. Referring to FIG. 6, in some embodiments the A-shield assembly 110 includes a cooling attachment 160. The cooling attachment 160 includes a cooling passage adapted to receive a coolant to provide cooling to the gearbox attachment 140, and in particular, to provide cooling for the gear reduction assembly. In the embodiment illustrated, the cooling attachment 160 is positioned adjacent to the outer ring 143 of the gearbox attachment 140 at an outer face of the gearbox attachment (opposite the A-shield 120). In embodiments, the cooling attachment 160 is affixed to the gearbox attachment 140 by one or more of a press fit, an adhesive, and fasteners. The cooling attachment 160 includes a coolant inlet 161 and a coolant outlet 162 for connecting the cooling passage to a coolant source.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A gearbox attachment of a wheel drive unit A-shield assembly for a four motor powertrain system of an electric vehicle, the gearbox attachment comprising:
    a housing adapted to fasten to an A-shield of the wheel drive unit A-shield assembly, the housing including an outer ring;
    a gear reduction assembly at least partially received in the outer ring, the gear reduction assembly adapted to receive an output of a gearbox of the wheel drive unit A-shield assembly that is adapted to provide an output of a motor to a single wheel of the electric vehicle, the gear reduction assembly adapted to provide a gear reduction for a higher torque and slower speed in a gear reduction mode than a torque and speed in a standard mode; and
    an actuator assembly adapted to actuate the gear reduction assembly output between the gear reduction mode and the standard mode.

2. The gearbox attachment of claim 1, wherein the standard mode provides no gear reduction to the output of the gearbox.

3. The gearbox attachment of claim 2, wherein the gear reduction assembly provides a gear reduction between 1.5:1 and 5.0:1 in the gear reduction mode and a gear reduction of 1:1 in the standard mode.

4. The gearbox attachment of claim 1, wherein the housing includes a mounting bracket adapted to connect to a subframe of the electric vehicle, and wherein the mounting bracket is adapted to connect the A-shield to the subframe.

5. The gearbox attachment of claim 4, wherein the housing, including the outer ring and the mounting bracket, is a unitary structure that is a single structurally formed entity.

6. The gearbox attachment of claim 1, wherein the gear reduction assembly is a planetary gear assembly comprising:
    a gear shaft including a sun gear and a spline adapted to receive the output of the gearbox;
    a plurality of planetary gears;
    a plurality of pins adapted to support the planetary gears;
    an inner carrier assembly positioned at an input side of the gearbox attachment; and
    an outer carrier assembly positioned at an output side of the gearbox attachment.

7. The gearbox attachment of claim 1, further comprising:
    a cooling attachment adapted to connect to a face of the gearbox attachment and adapted to provide cooling for the gear reduction assembly.

8. An A-shield assembly of a wheel drive unit of a four motor powertrain system of an electric vehicle, the A-shield assembly comprising:
    an A-shield adapted to support a motor mounted thereto, the motor adapted to provide power to a single wheel of the electric vehicle;
    a gearbox mounted to the A-shield, the gearbox including a gear assembly adapted to receive an output of the motor and output a first gear reduction; and
    a gearbox attachment including
        a housing is coupled to the A-shield, the housing including an outer ring,
        a gear reduction assembly at least partially received in the outer ring, the gear reduction assembly coupled to the gear assembly to receive the output of the gearbox, the gear reduction assembly adapted to provide a second gear reduction for a higher torque and slower speed in a gear reduction mode than that of the first gear reduction, and
        an actuator assembly adapted to actuate the gear reduction assembly output between the gear reduction mode and a standard mode.

9. The A-shield assembly of claim 8, wherein the standard mode provides no gear reduction to the output of the gearbox.

10. The A-shield assembly of claim 9, wherein the second gear reduction is a gear reduction between 1.5:1 and 5.0:1 in the gear reduction mode and a gear reduction of 1:1 in the standard mode.

11. The A-shield assembly of claim 8, wherein the housing includes a mounting bracket adapted to connect to a subframe of the electric vehicle, and wherein the mounting bracket is adapted to connect the A-shield to the subframe.

12. The A-shield assembly of claim 11, wherein the housing, including the outer ring and the mounting bracket, is a unitary structure that is a single structurally formed entity.

13. The A-shield assembly of claim 8, wherein the gear reduction assembly is a planetary gear assembly comprising:
    a gear shaft including a sun gear and a spline coupled to the output of the gear assembly of the gearbox;
    a plurality of planetary gears;
    a plurality of pins adapted to support the planetary gears;
    an inner carrier assembly positioned at an input side of the gearbox attachment; and
    an outer carrier assembly positioned at an output side of the gearbox attachment.

14. The A-shield assembly of claim 8, wherein the gearbox attachment further includes a cooling attachment adapted to connect to a face of the gearbox attachment and adapted to provide cooling for the gear reduction assembly.

15. A wheel drive unit of a four motor powertrain system of an electric vehicle, the wheel drive unit comprising:
    an A-shield;
    a motor adapted to output power to a single wheel, the motor coupled to the A-shield;
    a gearbox mounted to the A-shield, the gearbox including a gear assembly coupled to an output of the motor and adapted to output a first gear reduction; and
    a gearbox attachment including
        a housing fastened to the A-shield, the housing including an outer ring, a gear reduction assembly at least partially received in the outer ring, the gear reduction assembly coupled to the gear assembly to receive the output of the gearbox, the gear reduction assembly adapted to provide a second gear reduction for a higher torque and slower speed in a gear reduction mode than that of the first gear reduction, and an actuator assembly adapted to actuate the gear reduction assembly output between the gear reduction mode and a standard mode.

16. The wheel drive unit of claim 15, wherein the standard mode provides no gear reduction to the output of the gearbox.

17. The wheel drive unit of claim 16, wherein the second gear reduction is a gear reduction between 1.5:1 and 5.0:1 in the gear reduction mode and a gear reduction of 1:1 in the standard mode.

18. The wheel drive unit of claim 15, wherein the housing includes a mounting bracket adapted to connect to a subframe of the electric vehicle, and wherein the mounting bracket is adapted to connect the A-shield to the subframe.

19. The wheel drive unit of claim 18, wherein the housing, including the outer ring and the mounting bracket, is a unitary structure that is a single structurally formed entity.

20. The wheel drive unit of claim 15, wherein the gear reduction assembly is a planetary gear assembly comprising:
a gear shaft including a sun gear and a spline coupled to the output of the gear assembly of the gearbox;
a plurality of planetary gears;
a plurality of pins adapted to support the planetary gears;
an inner carrier assembly positioned at an input side of the gearbox attachment; and
an outer carrier assembly positioned at an output side of the gearbox attachment.

\* \* \* \* \*